United States Patent
Byun et al.

(10) Patent No.: US 11,085,339 B2
(45) Date of Patent: Aug. 10, 2021

(54) METHOD OF CONTINUOUSLY VARIABLE VALVE DURATION POSITION LEARNING BASED ON CONDITIONAL APPLICATION AND CONTINUOUSLY VARIABLE VALVE DURATION SYSTEM THEREFOR

(71) Applicants: Hyundai Motor Company, Seoul (KR); KIA Motors Corporation, Seoul (KR)

(72) Inventors: Jung-Sup Byun, Gyeonggi-do (KR); Hee-Nam Woo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 15 days.

(21) Appl. No.: 16/211,880

(22) Filed: Dec. 6, 2018

(65) Prior Publication Data

US 2020/0072132 A1 Mar. 5, 2020

(30) Foreign Application Priority Data

Aug. 30, 2018 (KR) .................. 10-2018-0102590

(51) Int. Cl.
*F01L 13/00* (2006.01)
*F02D 13/02* (2006.01)
*G06N 20/00* (2019.01)

(52) U.S. Cl.
CPC ...... *F01L 13/0015* (2013.01); *F02D 13/0207* (2013.01); *F01L 2013/111* (2013.01); *F01L 2201/00* (2013.01); *F01L 2800/09* (2013.01); *F01L 2800/12* (2013.01); *F02D 2200/021* (2013.01); *F02D 2200/0414* (2013.01); *F02D 2200/101* (2013.01); *F02D 2200/501* (2013.01); *F02D 2200/602* (2013.01); *F02D 2200/70* (2013.01); *G06N 20/00* (2019.01)

(58) Field of Classification Search
None
See application file for complete search history.

(56) References Cited

U.S. PATENT DOCUMENTS

| 6,325,029 B1 * | 12/2001 | Takahashi | F01L 1/34 123/90.15 |
| 2005/0010354 A1 * | 1/2005 | Fuwa | F01L 13/0015 701/104 |
| 2005/0211207 A1 * | 9/2005 | Urushihata | F01L 1/024 123/90.17 |

(Continued)

FOREIGN PATENT DOCUMENTS

JP 2013167223 A 8/2013
WO WO-2007122875 A1 * 11/2007 ............. F02D 41/00

*Primary Examiner* — Patrick Hamo
*Assistant Examiner* — Wesley G Harris
(74) *Attorney, Agent, or Firm* — Brinks Gilson & Lione

(57) ABSTRACT

A method of continuously variable valve duration (CVVD) location learning may include when a controller determines necessity of position learning for short duration and long duration of a CVVD system, performing conditional application re-learning control in which the position learning is performed in a situation in which validity determination of system environment condition for CVVD hardware and validity determination of vehicle environment condition for engine operation information of an engine are satisfied.

18 Claims, 5 Drawing Sheets

(56) References Cited

U.S. PATENT DOCUMENTS

| | | | | |
|---|---|---|---|---|
| 2007/0227483 A1* | 10/2007 | Inoue | ................... | F01L 1/024 |
| | | | | 123/90.17 |
| 2008/0167789 A1* | 7/2008 | Okamoto | ............... | F01L 1/047 |
| | | | | 701/105 |
| 2019/0293018 A1* | 9/2019 | Byun | ................ | F02D 41/3854 |

* cited by examiner

METHOD OF CONTINUOUSLY VARIABLE VALVE DURATION POSITION LEARNING BASED ON CONDITIONAL APPLICATION AND CONTINUOUSLY VARIABLE VALVE DURATION SYSTEM THEREFOR

CROSS-REFERENCE TO RELATED APPLICATION

This application claims priority to and the benefit of Korean Patent Application No. 10-2018-0102590, filed on Aug. 30, 2018, the entire contents of which are incorporated herein by reference in their entirety.

FIELD

The present disclosure relates to continuously variable valve duration (CVVD) position learning.

BACKGROUND

The statements in the section merely provide background information related to the present disclosure and may not constitute prior art.

Generally, a continuously variable valve duration (CVVD) system which is a valve variable mechanism performs valve duration learning (i.e., an open state period of an intake valve with a duration of a cam operating the intake valve) at the beginning of engine assembly in an end of line (EOL) to allow an accurate duration/timing control operation. In this case, the valve duration learning of the EOL means CVVD position learning by initial learning or EOL learning.

Further, the CVVD system performs valve duration position learning (including the initial learning and re-learning) due to various causes.

An example of a valve duration learning (the initial learning and the re-learning) of the CVVD system as follows.

Learning requirements (including the initial learning and the re-learning) may include: 1) a valve duration current value loss due to replacement of a CVVD single item (a motor and the like) and parts, 2) a valve duration current value loss due to a sensor failure or a connector detachment and a motor failure caused by power off, and 3) a valve duration current value loss due to a communication error (e.g., a controller area network (CAN) between the CVVD system and an engine management system (EMS)).

Learning procedure (the same as those of the initial learning and the re-learning): 1) determining a current state, 2) applying a predetermined CVVD controller duty (e.g., 50% duty) for a predetermined time (ms), 3) recognizing position movements of short duration and long duration according to the applying of the duty as a position value, and 4) storing a learning value of a position value according to completion of valve duration learning.

As a result, the valve duration position learning (the initial learning and the re-learning) provides a CVVD system operation without deviation in an air amount, a side effect, and a causing misidentification.

We have discovered that the re-learning of the valve duration position learning after the initial learning may be performed in a field where it is a challenge to secure a valid environment condition, and a re-learning harmful effect of not being capable of securing validity of the learning value in an invalid environment condition of the field may be developed into the following situations.

First, learning is unnecessarily performed such that excessive deviation in learning cannot be prevented. Second, deviation in air amount may occur due to the deviation in learning value deviation such that it impossible to perform normal air amount control. Third, an unexpected side effect due to excessive deviation in air amount may occur. Fourth, a CVVD system error due to re-learning is output as an irrelevant vehicle state such that it is difficult to identify a cause of the CVVD system error, which increases service costs.

SUMMARY

The present disclosure describes a method of continuously variable valve duration (CVVD) position learning based on conditional application and a CVVD system therefor, which are capable of reducing service costs and preliminarily removing an unexpected side effect to secure stability by classifying a learning environment condition into a condition capable of securing validity of a learning value and a condition not capable of securing the validity of the learning value to prevent a harmful effect of learning or re-learning in which securing of validity is difficult, and particularly, by accurately determining a cause of non-performance or prohibition of the learning through exhibition of an error code on the basis of the definite learning environment condition classification.

A method of continuously variable valve duration (CVVD) location learning is now described, which includes, when a controller determines necessity of position learning for short duration and long duration of a CVVD system, performing conditional application re-learning control in which the position learning is performed only in a situation in which validity determination of system environment condition for CVVD hardware and validity determination of vehicle environment condition for engine operation information of an engine are satisfied.

The position learning may be performed by determining necessity of a situation in which an existing learning value is not applicable due to replacement of the CVVD hardware. The necessity determination may be performed by setting a hall sensor, a motor, and a controller area network (CAN), which are applied to the CVVD hardware as a system environmental condition factor, the validity determination of the system environment condition according to a normal operation state of a system environment condition factor is performed by setting a state of the hall sensor, a state of the motor, and a state of the CAN as selection conditions, and the position learning may be performed when the system environment condition validity is secured, whereas when the system environment condition validity is not secured, the position learning may not be performed while a system learning prohibition code is exhibited.

The performing of the conditional application re-learning control may include, after securing the system environment condition validity through the determining of the system environment condition validity, securing vehicle environment condition validity by determining the vehicle environment condition validity on the engine operation information, performing normal learning for the position learning, and performing valve control by replacing learning value acquired by the normal learning with an existing learning.

The engine operating information may include one or more among an engine revolutions per minute (RPM), a vehicle speed, an opening degree of an accelerator pedal, a battery voltage, a temperature of cooling water, and a temperature of intake air. The determining of the vehicle environment condition validity may be performed when each of the engine RPM, the vehicle speed, the opening degree of the accelerator pedal, the battery voltage, the temperature of cooling water, and the temperature of the intake air satisfies the threshold value, and the position learning may be performed when the vehicle environment condition validity is secured, whereas when the vehicle environment condition validity is not secured, a vehicle learning prohibition code may be exhibited and the position learning may not be performed.

When the determining of the system environment condition validity determination is troubled (or prohibited) or the determining of the vehicle environment condition validity determination is unsatisfied, the controller may be switched to re-learning prohibition control for applying limp home control in which a learning value is replaced with a default value defined to prevent an engine starting off.

When the position learning is not necessary, the controller may be switched to learning value maintenance control, and the existing learning value may be applied in the learning value maintenance control.

A continuously variable valve duration (CVVD) system may include a controller configured to perform conditional application re-learning control in which position learning is performed by securing system environment condition validity for CVVD hardware and vehicle environment condition validity for engine operating information in a situation in which the position learning is desired in short and long duration directions, re-learning prohibition control in which a learning value is replaced with a default value with a limp home in a situation of determination prohibition of the system environment condition validity or the vehicle environment condition validity, and learning value maintenance control for applying an existing learning value in a situation in which the position learning is not necessary.

The controller may include a valid learning condition map, and a table for securing the vehicle environment condition validity by setting an engine revolutions per minute (RPM), a vehicle speed, an opening degree of an accelerator pedal, a battery voltage, a temperature range of cooling water, and a temperature range of intake air as the engine operation information, together with a table for securing the system environment condition validity by setting a sensor, a motor, and a controller area network (CAN) as the CVVD hardware is constructed in the valid learning condition map.

The controller may further include a code generator, and the code generator may generate a system learning prohibition code according to prohibition to secure the system environment condition validity and a vehicle learning prohibition code according to prohibition to secure the vehicle environment condition validity.

The system learning prohibition code may exhibit a failure state of either the hall sensor, the motor, or the CAN, and the vehicle learning prohibition code may exhibit a detection state with respect to each of the engine RPM, the vehicle speed, the opening degree of the accelerator pedal, the battery voltage, the temperature range of the cooling water, and the temperature range of the intake air.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
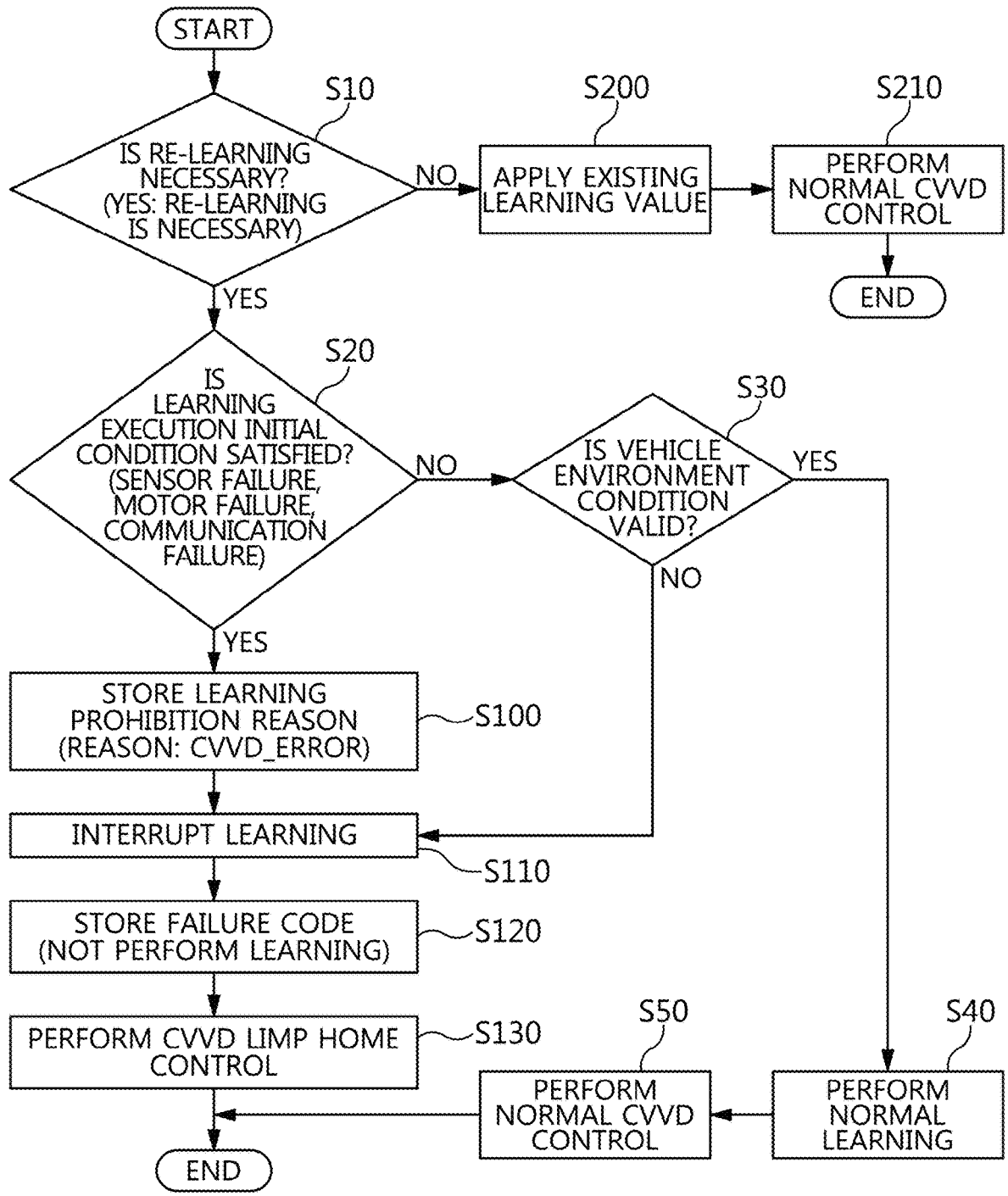
FIG. 1 is a flowchart of a method of continuously variable valve duration (CVVD) position learning based on conditional application.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Aspects of the present disclosure may be provided in various other different forms by those skilled in the art, such that the present disclosure is not limited.

Referring to FIG. 1, a method of continuously variable valve duration (CVVD) position learning for a CVVD system is classified into re-learning determination control (S10 and S20), conditional application re-learning control (S30 to S50), re-learning prohibition control (S100 to S130), and learning value maintenance control (S200 and S210). Therefore, the method of CVVD position learning is defined as a method of CVVD position learning based on conditional application.

For example, the re-learning determination control (S10 and S20) detects a sensor, a motor, and communication information according to motor replacement of the CVVD system as system environment condition factors. Since vehicle environment condition validity has been achieved with satisfaction of a threshold value condition for engine operation information detected as a vehicle environment condition factor in a state of securing system environment condition validity in which the sensor, the motor, and communication, which are the system environment condition factors according to the motor replacement, are normal, the conditional application re-learning control (S30 to S50) performs re-learning to replace an existing learning value applied to CVVD system control. Since the system environment condition validity and vehicle environment condition validity are not yet achieved, the re-learning prohibition control (S100 to S130) applies a default value to the existing learning value applied to the CVVD system control. Since the re-learning is unnecessary, the learning value maintenance control (S200 and S210) directly applies the existing learning value to the CVVD system control.

From the foregoing, the method of CVVD position learning based on conditional application determines a normal re-learning condition for a re-learning required situation of the CVVD system by applying 1) a state of replacing a CVVD single item (a motor and the like) and parts, 2) states of a sensor failure, a connector detachment, and a motor failure due to power off, and a state of a CAN communication failure between the CVVD system and the EMS as a valid environment condition. Particularly, threshold conditions, such as an engine revolutions per minute (RPM), a vehicle speed, an opening degree of an accelerator pedal opening, a battery voltage, a temperature range of cooling water, and a temperature range of intake air, are sequentially considered to re-learning of the valid environment condition such that it is possible to prevent occurrence of deviation in re-learning and definitely exhibit a cause of re-learning prohibition and an error cause of the re-learning prohibition with a failure code.

Figure 2:
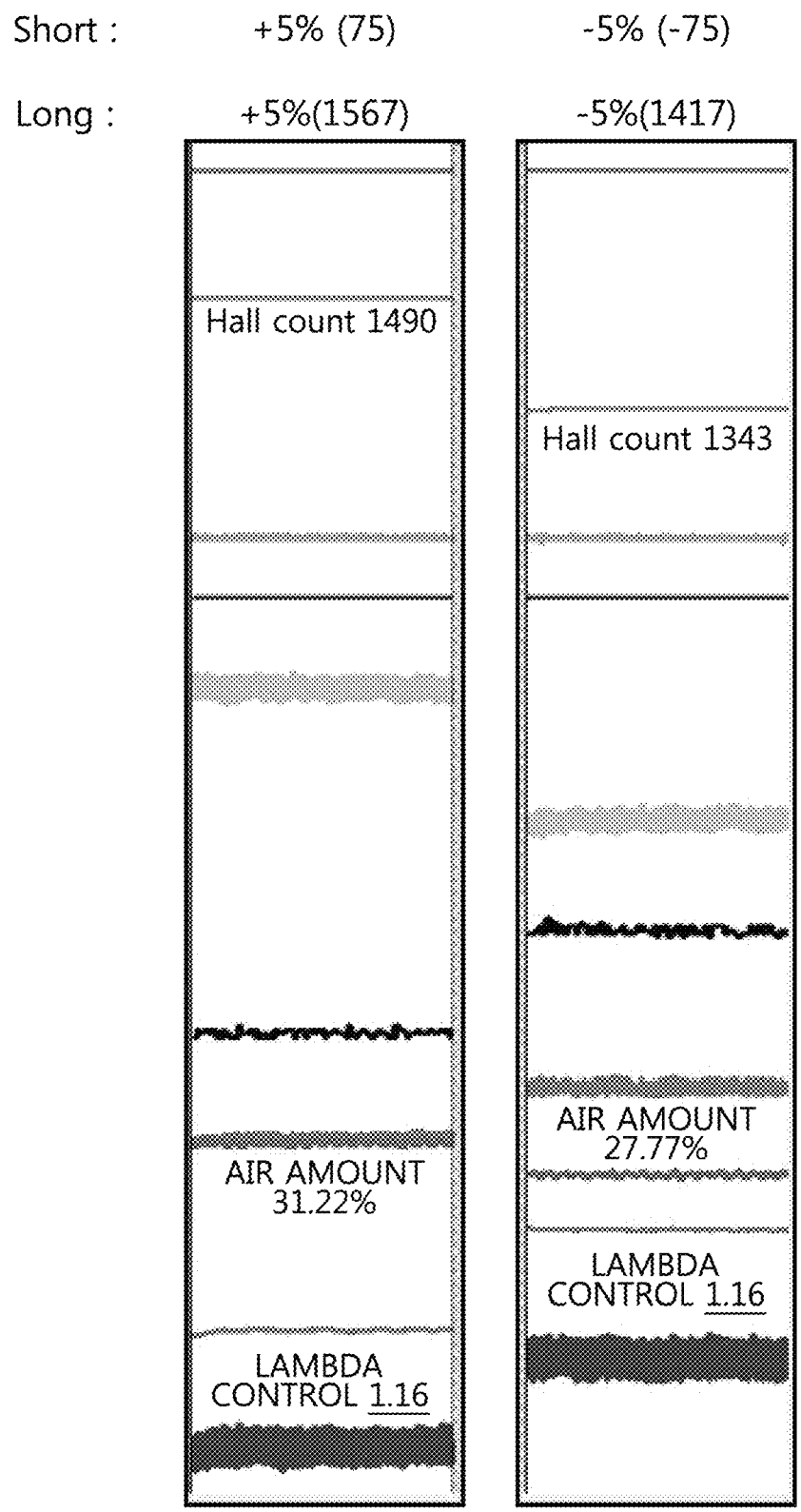
FIG. 2 is an example of deviation in learning value of the CVVD system, which is corrected by re-learning of the method of CVVD position learning; based on conditional application.

Meanwhile, referring to FIG. 2, the need for the CVVD position learning based on conditional application is exemplified from a result of a deviation determination test according to conventional CVVD position learning.

For example, in an example of generation of a learning deviation according to an oil temperature at the time of starting learning at a temperature of −30° C. (30° C. below zero), when a motor rotation)(° corresponds to an xxxx count (a setting value according to a vehicle type) from short duration to long duration, it can be seen that a learning value difference of about 75 is generated by a cold starting learning value 1566 and a hot starting learning value 1491, or a learning value difference of about 19 is generated by a cold starting learning value 1517 and a hot starting learning value 1498. For example, in an example of deviation generation according to power generation control (supply voltage), it can be seen that a learning value difference of about 5 is generated by a 12V learning value 1499 and a 14.5V learning value 1504.

Therefore, a learning deviation result of the learning value difference with respect to learning duty is exhibited as a learning value increasing tendency when the learning duty increases, and the learning value increasing tendency may generate deviation in air amount of about 27% by varying a lambda control value of about 0.89 in short direction learning of +5% and long direction learning of +5% to a lambda control value of about 1.16 in the short direction learning of −5% and the long direction learning of −5%.

Consequently, the method of CVVD position learning based on conditional application of FIG. 1 may prevent excessive deviation in FIG. 2 which may occur in a learning value acquired by re-learning in an invalid environment condition such as a field after the initial learning of the CVVD system with respect to valve duration (e.g., an intake valve). In this case, eliminating the excessive deviation removes occurrence of unintended errors due to excessive engine friction by a low-temperature condition and deviation in air amount according to the learning value deviation.

Figure 3:
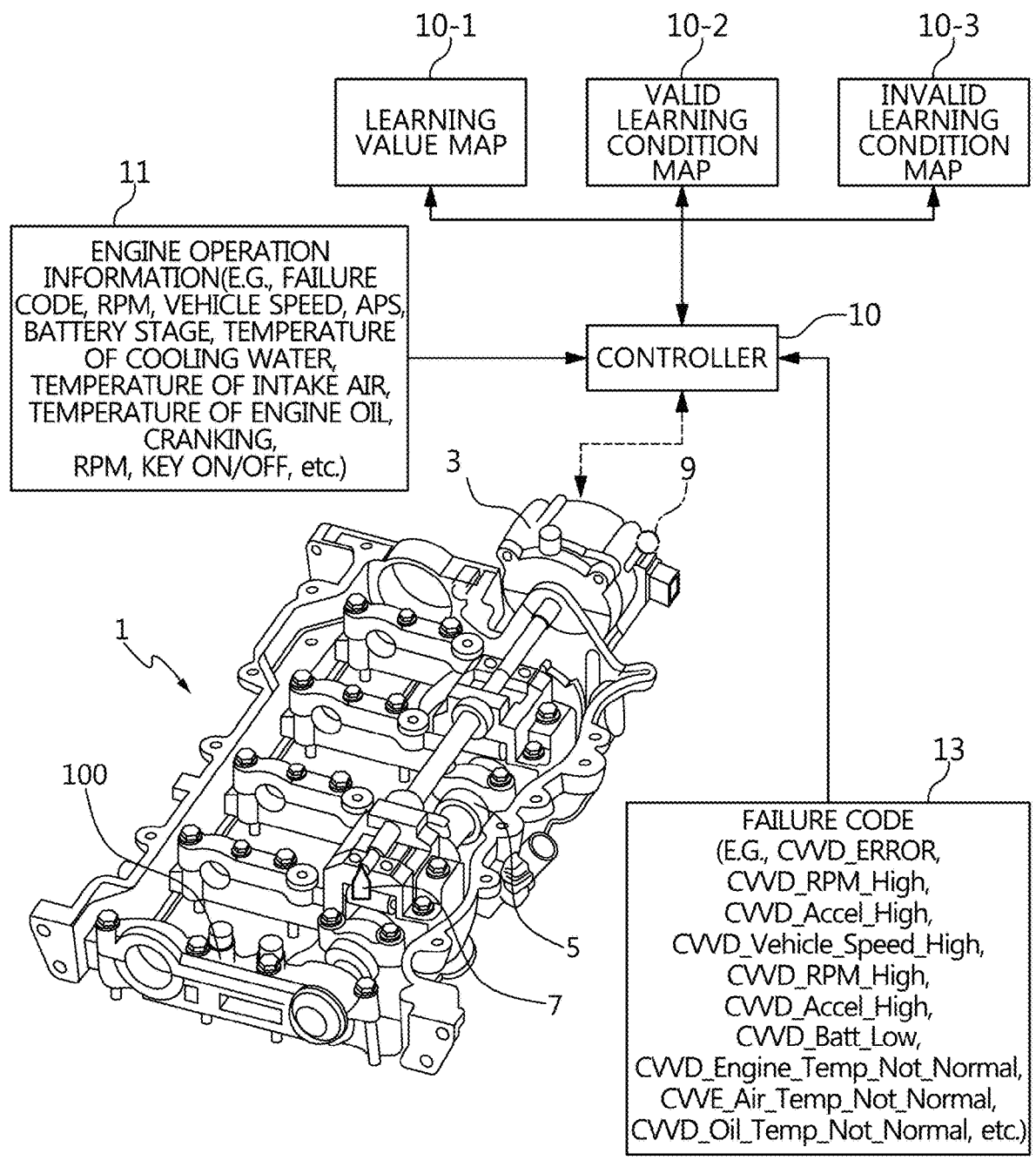
FIG. 3 is an example of a CVVD system in which the method of CVVD position learning based on conditional application.

Meanwhile, FIG. 3, the CVVD system 1 includes a CVVD control unit 3, a CVVD mechanism 5, a stopper 7, and a Hall sensor 9 as components to be assembled to the engine 100, and the CVVD system 1 includes a controller 10 configured to control the CVVD control unit 3.

For example, the CVVD control unit 3 includes a brushless direct current (BLDC) three-phase motor and a control shaft connected to a cam and rotated by a motor. The CVVD mechanism 5 is assembled to a camshaft configured to open and close intake/exhaust valves and engaged with a housing surrounding a gear and a link connected to a control shaft. The stopper 7 is a mechanical stopper of a CVVD, which is provided at an end portion of the control shaft of the CVVD control unit 3 to detect a short or long position arrival. The Hall sensor 9 is embedded in a motor portion of the CVVD control unit 3 to detects a short/long direction position due to a rotation of the motor. Particularly, although not shown in the CVVD control unit 3, an angular sensor is installed at the motor portion and detects a rotational angle with respect to the rotation of the motor to correct an error of the Hall sensor 9 (e.g., Hall missing). Here, the Hall missing means that an actual number of rotations of the motor is recognized as a much smaller value such that a rotation amount of the motor, which is larger than a rotation amount of the motor converted into a Hall sensor signal value converging on a target position, is generated at the motor.

For example, the controller 10 includes a learning value map 10-1, a valid learning condition map 10-2, an invalid learning condition map 10-3, a data detector 11, and a code generator 13. Therefore, the controller 10 is configured with an electronic control unit (ECU) driver for controlling the valid learning condition map 10-2, the invalid learning condition map 10-3, the data detector 11, and the code generator 13.

Particularly, the learning value map 10-1 constructs a table for storing and updating a learning value for a position of valve durations acquired by CVVD learning and re-learning. The valid learning condition map 10-2 constructs a threshold value condition table for an engine RPM, a vehicle speed, an opening degree of accelerator pedal, a battery voltage, a temperature range of cooling water, and a temperature range of intake air so as to secure vehicle environment condition validity, together with sensor/motor/communication information for securing system environment condition validity. The invalid learning condition map 10-3 constructs a threshold value condition table for the engine RPM, the vehicle speed, the opening degree of the accelerator pedal, the battery voltage, the temperature range of the cooling water, and the temperature range of the intake air, together with hardware and communication failure data.

Particularly, the data detector 11 detects engine operation information for the engine 100 as a vehicle environment condition factor together with system environment condition factors such as CVVD single item replacement, a hall sensor failure, a motor connector detachment, a motor failure due to power off, and a CAN communication error and provides the detected factors to the controller 10, and the engine operation information includes a vehicle failure code (e.g., a diagnostic trouble code (DTC) in which an abnormal state (an error or a failure status) which may occur when the vehicle is running is recorded), the engine RPM, the vehicle speed, an accelerator position scope (APS), a battery charging state (e.g., a state of charge (SOC)), a temperature of the cooling water, a temperature of the intake air, a temperature of engine oil, engine cranking (a rotational state of a crankshaft by a starter motor), a motor RPM, an engine ignition key ON/OFF.

Particularly, the code generator 13 constructs the failure code table and the cause of the CVVD re-learning prohibition due to non-securing of a valid environment condition out of the threshold value condition as a learning prohibition code. For example, a system learning prohibition code due to non-securing of the system environment condition validity is exhibited as "CVVD_ERROR" to notify a failure of either the Hall sensor, the motor, or the CAN. For example, a vehicle learning prohibition code due to non-securing of vehicle environment condition validity is exhibited as CVVD_ERROR (sensor/motor/CAN communication error), CVVD_RPM_High (engine RPM error), CVVD_Accel-_High (accelerator pedal error), CVVD_Vehicle_Speed-_High (vehicle speed error), CVVD_Batt_Low (battery error), CVVD_Engine_Temp_Not_Normal (cooling water temperature error), CVVD_Air_Temp_Not_Normal (intake air temperature error), and CVVD_Oil_Temp_Not_Normal (engine oil temperature error), thereby notifying that a threshold value condition of a corresponding device is not satisfied.

The method of CVVD position learning based on conditional application of FIG. 1 will be described in detail below with reference to FIGS. 3 to 4b. In this case, a control main body is the controller 10, a control target is the CVVD system 1, and detection target includes the motor of the CVVD control unit 3, the Hall sensor 9, a CAN line (a communication line between CVVD system 1 and the EMS (not shown)), a vehicle temperature sensor, the engine 100, a vehicle speed sensor, and an ignition key/an accelerator pedal/a battery/a starter motor/a crankshaft (not shown).

First, the controller 10 performs the re-learning determination control (S10 and S20) as determining whether re-learning is necessary (S10) and determining whether a learning execution initial condition is satisfied (S20).

Referring to FIG. 3, the controller 10 confirms motor replacement of the CVVD single item replacement information among the CVVD system abnormality information provided from the data detector 11 so as to perform the determining of whether the re-learning is necessary (S10) to determine re-learning necessity on the basis of the confirmation. In this case, the re-learning necessity is determined by the motor replacement, and alternatively, the re-learning necessity may be determined according to whether accuracy of a detection value of the Hall sensor 9 according to a rotation of the replaced motor is satisfied. Therefore, the result of the determining of whether the re-learning is necessary (S10) is classified into executing the determining of whether the learning execution initial condition is satisfied (S20) in consideration of the re-learning necessity, and executing the learning value maintenance control (S200 and S210) in non-consideration of the re-learning necessity.

Further, the controller 10 detects information on the Hall sensor, the motor, and the CAN communication among the CVVD system abnormality information provided from the data detector 11 as the system environment condition factors so as to execute the determining of whether the learning execution initial condition is satisfied (S20), and the controller 10 determines a Hall sensor state, a motor state, and the CAN state as being normal or as failing. In this case, a selection condition (i.e., an OR condition) is applied to determine whether the Hall sensor is normal or fails, whether the motor is normal or fails, and whether the CAN is normal or fails.

For example, the determining of whether the learning execution initial condition is satisfied (S20) may be performed through a current failure state confirmation according to detected states (e.g., ON, OFF, or OK) such as "Does the Hall sensor fail at a current time?," "Does the motor fail at a current time?," and "Does the CAN communication between a CVVD controller and an EMS fails at a current time?," and thus a non-securing state of the system environment condition validity is determined. Then, the controller 10 exhibits the non-securing state of the system environment condition validity as a "CVVD_ERROR" code and stores the "CVVD_ERROR" code in the code generator 13.

The result of the determining of whether the learning execution initial condition is satisfied (S20) is classified into execution of the conditional application re-learning control (S30 to S50) according to securing of the system environment condition validity due to one among the Hall sensor as being normal, the motor as being normal, and the CAN as being normal, and execution of the re-learning prohibition control (S100 to S130) according to non-securing of the system environment condition validity due to one among the Hall sensor failure, the motor failure, and the CAN failure.

Subsequently, the controller 10 performs the conditional application re-learning control (S30 to S50) as determining vehicle environment condition validity (S30), performing normal learning (S40), and performing valve control (S50).

Referring to FIG. 3, in order to perform the determining of the vehicle environment condition validity (S30), the controller 10 detects information on the engine RPM, the vehicle speed, the opening degree of the accelerator pedal, the battery voltage, the temperature range of the cooling water, and the temperature range of the intake air among the engine operation information provided from the data detector 11, and the controller 10 secures the vehicle environment condition validity with a selection condition (i.e., an OR condition) in which a detected value is confirmed by matching data constructed in the valid learning condition map 10-2 with the vehicle environment condition factor. The result of the determining of the vehicle environment condition validity (S30) is classified into execution of the performing of the normal learning (S40), and execution of the re-learning prohibition control (S100 to S130) according to non-securing of the vehicle environment condition validity.

Further, in order to execute the performing of the normal learning (S40), the controller 10 is associated with the valid learning condition map 10-2 to determine a current state (Operation1), apply a predetermined CVVD control unit duty (e.g., 50% duty) for a predetermined time (ms) (Operation 2), and recognize position movements in short and long duration directions as position values according to the application of the predetermined CVVD control unit duty (Operation 3), and the controller 10 is associated with the learning value map 10-1 to update and store an existing learning value as a learning value of the position value according to completion of valve duration learning (Operation 4). Thereafter, in order to execute the performing of the valve control (S50), the controller 10 reads the learning value stored in the learning value map 10-1 through re-learning to perform duty control which is output to the motor of the CVVD control unit 3.

Figure 4A:
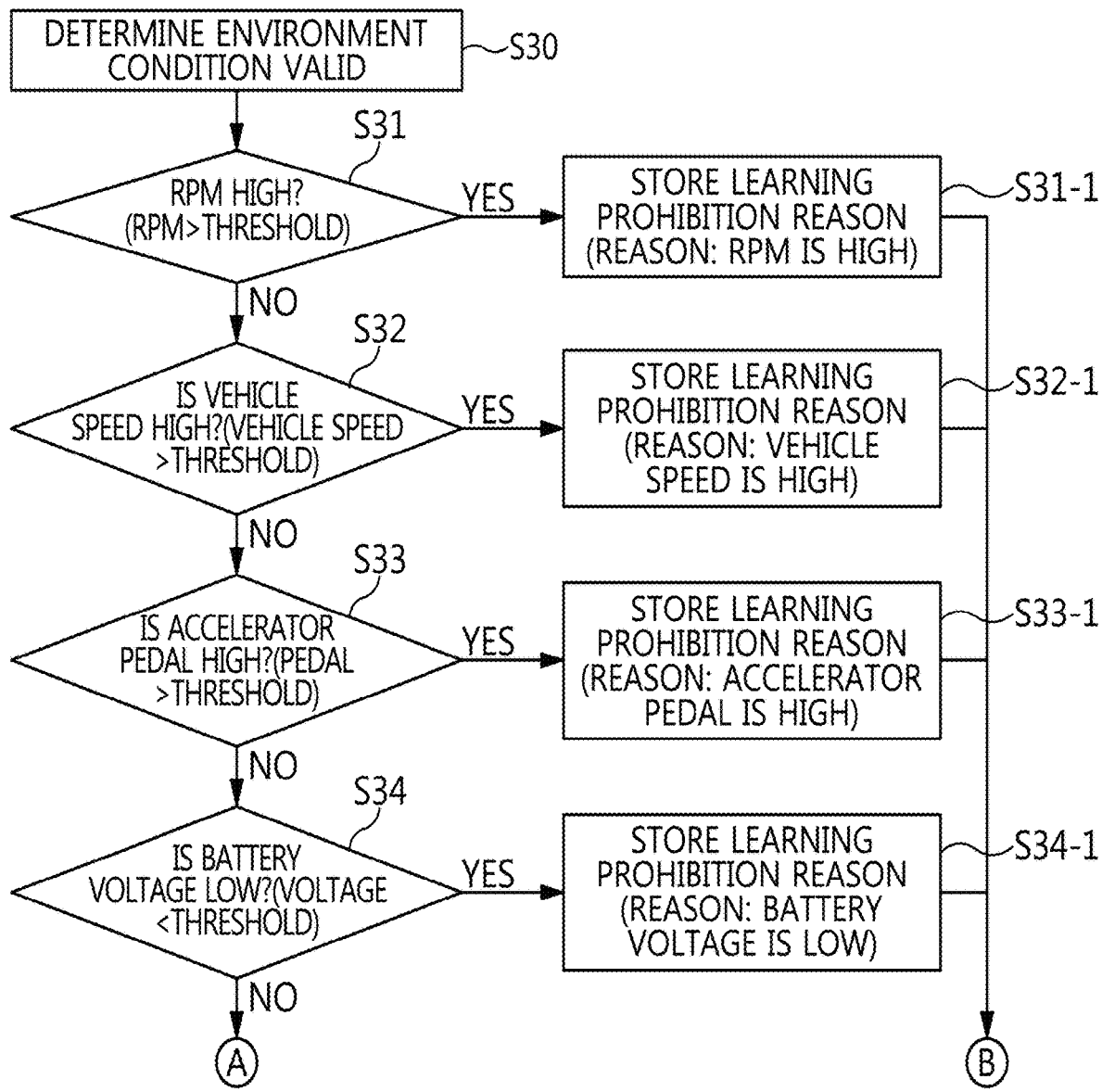
FIGS. 4*a* and 4*b* are flowcharts illustrating application of a threshold value condition for securing vehicle environment condition validity in a state in which a system environment condition validity is secured.
Figure 4B:
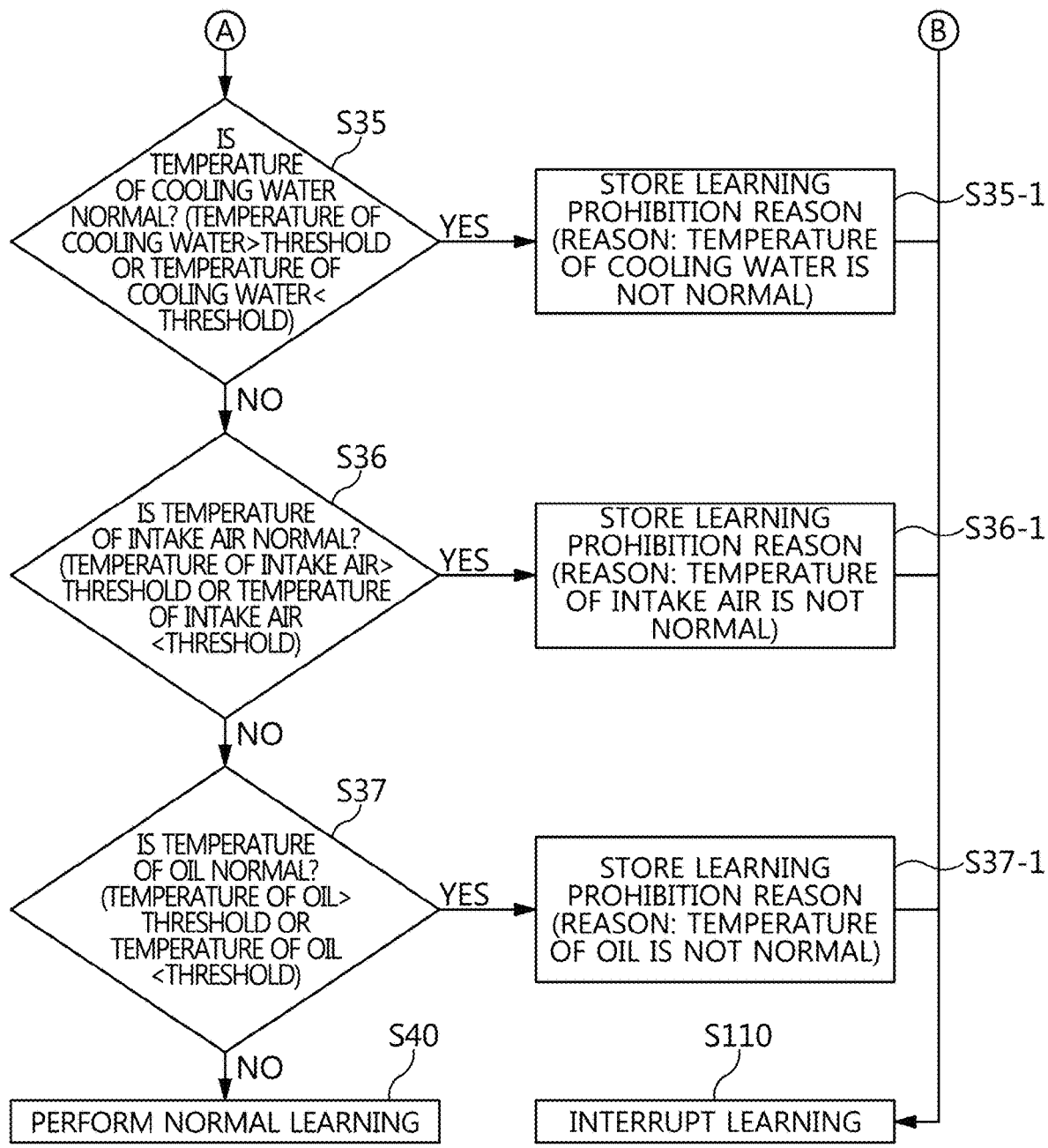

Referring to FIGS. 4a and 4b, the determining of the vehicle environment condition validity (S30) is divided into determining the engine RPM (S31), determining the vehicle speed (S32), determining the accelerator pedal (S33), determining the battery (S34), determining a temperature of the cooling water (S35), determining a temperature of the intake air (S36), and determining a temperature of oil (S37). Here, a "threshold value" is a setting value which is different according to a vehicle type, and ">" is an inequality sign indication a magnitude between two values.

For example, the determining the engine RPM (S31) includes applying a condition of "RPM>threshold value," and when the engine RPM is high and thus re-learning is not suitable, generating a CVVD_RPM_High_code (S31-1), and then the procedure proceeds to interrupting learning (S110) of the re-learning prohibition control (S100 to S130). The determining of the vehicle speed (S32) includes applying a condition of "vehicle speed>threshold value," and when the vehicle speed is high and thus the re-learning is not suitable, generating a CVVD_Vehicle_Speed_High code (S32-1), and then the procedure proceeds to the interrupting of the learning (S110) of the re-learning prohibition control (S100 to S130). The determining of the accelerator pedal (S33) includes applying a condition of "APS>threshold value," and when the accelerator pedal is excessively stepped on and thus the re-learning is not suitable, generating a CVVD_Accel_High code (S33-1), and then the procedure proceeds to the interrupting of the learning (S110) of the re-learning prohibition control (S100 to S130). The determining of the battery (S34) includes applying a condition of "battery voltage<threshold value," and when the battery voltage is low and thus the re-learning is not suitable, generating a CVVD_Batt_Low code (S34-1), and then the procedure proceeds to the interrupting of the learning (S110) of the re-learning prohibition control (S100 to S130). The determining of the temperature of the cooling water (S35) includes applying a condition of "temperature of cooling water<high/low threshold values (Threshold_High/Threshold_Low)," and when the temperature of the cooling water is high or low and thus the re-learning is not suitable, generating a CVVD_Engine_Temp_Not_Normal code (S35-1), and then the procedure proceeds to the interrupting of the learning (S110) of the re-learning prohibition control (S100 to S130). The determining of the temperature of the intake air (S36) includes applying a condition of "temperature of intake air<high/low threshold values (Threshold_High/Threshold_Low)," and when the temperature of the intake air is high or low and thus the re-learning is not suitable, generating a CVVD_Air_Temp_Not_Normal code (S36-1), and then the procedure proceeds to the interrupting of the learning (S110) of the re-learning prohibition control (S100 to S130). The determining of the temperature of the oil (S37) includes applying a condition of "temperature of oil<high/low threshold values (Threshold_High/Threshold_Low)," and when the temperature of the oil is high or low and thus the re-learning is not suitable, generating a CVVD_Oil_Temp_Not_Normal code (S37-1), and then the procedure proceeds to the interrupting of the learning (S110) of the re-learning prohibition control (S100 to S130).

Then, the controller 10 exhibits and stores the non-securing state of the vehicle environment condition validity as the CVVD_RPM_High_code, the CVVD_Vehicle_Speed_High code, the CVVD_Accel_High code, the CVVD_Batt_Low code, the CVVD_Engine_Temp_Not_Normal code, the CVVD_Air_Temp_Not_Normal code, and the CVVD_Oil_Temp_Not_Normal code in the code generator 13.

Meanwhile, the controller 10 performs the re-learning prohibition control (S100 to S130) as storing a learning prohibition reason (S100), the interrupting of the learning (S110), storing a failure code (S120), and performing CVVD limp home control (S130).

For example, the storing a learning prohibition reason (S100) is in a state in which the "CVVD_ERROR" code of the non-securing state of the system environment condition validity is stored in the code generator 13 during the determining of the vehicle environment condition validity (S30).

For example, the interrupting of the learning (S110) is in a state in which the vehicle environment condition validity is not secured in each of the determining of the engine RPM (S31), the determining of the vehicle speed (S32), the determining of the accelerator pedal (S33), the determining of the battery (S34), the determining of the temperature of the cooling water (S35), the determining of the temperature of the intake air (S36), and the determining of the temperature of the oil (S37). In the non-securing state of the vehicle environment condition validity, the storing of the failure code (S120) is in a state of storing the CVVD_RPM_High_code, the CVVD_Vehicle_Speed_High code, the CVVD_Accel_High code, the CVVD_Batt_Low code, the CVVD_Engine_Temp_Not_Normal code, the CVVD_Air_Temp_Not_Normal code, and the CVVD_Oil_Temp_Not_Normal code in the code generator 13.

For example, in order to perform reduced control of the CVVD system 1 due to the non-securing state of the system environment condition validity, or the vehicle environment condition validity, the performing of the CVVD limp home control (S130) is in an intake value control state in which a default value required to inhibit starting off is applied instead of the existing learning value of the learning value map 10-1.

Meanwhile, the controller 10 performs the learning value maintenance control (S200 and S210) as applying the existing learning value (S200) and performing normal CVVD control (S210).

For example, the applying the existing learning value (S200) is in a state of reading the existing learning value stored in the learning value map 10-1 so as to perform normal control for the CVVD system 1, and the performing the valve control (S210) is in a normal operating state of the CVVD system 1 in which the intake valve is controlled with the existing learning value.

As described above, the method of CVVD position learning control based on conditional application, which is applied to the CVVD system, implements the following actions and effects by definitely distinguishing advantages from disadvantages with respect to the learning environment conditions.

First, it is possible to compensate for vulnerability of a connection structure between a single item of the CVVD system and engine parts, which is developed into excessive learning deviation even due to an unnecessary air amount error caused by performance of learning in an invalid environment condition. Second, when the learning is performed only when validity of a learning value can be secured while the learning is not performed by defining a learning environment condition capable of securing the validity of the learning value, a failure code exhibiting a cause of non-performance of the learning expression is generated such that a present situation of the CVVD system can be accurately recognized. Third, an error of the CVVD system can be clarified by the failure codes of performance and non-performance of the learning such that a cause of non-performance of the learning can be clearly exhibited. Fourth, unexpected side effects are preliminarily removed while service costs for the CVVD system are reduced such that stability of a vehicle can be secured. Fifth, the learning environment condition is classified into securing of learning value validity and non-securing thereof such that a harmful effect of conventional CVVD re-learning (or initial learning) can be fundamentally resolved, and particularly, it is possible to improve performance of a conventional CVVD system by applying only the learning environment condition.

As described above, in accordance with the method of CVVD position learning based on conditional application, which is applied to the CVVD system 1, the controller 10 performs conditional application re-learning control in which position learning is performed by securing system environment condition validity for CVVD hardware and vehicle environment condition validity for engine operating information in a situation in which the position learning is required in short and long duration directions, re-learning prohibition control in which a learning value is replaced with a default value with a limp home in a situation of determination prohibition of the system environment condition validity or the vehicle environment condition validity, and learning value maintenance control for applying an existing learning value in a situation in which the position learning is not necessary such that a harmful effect of field learning causing learning value deviation can be prevented, and particularly, a a learning prohibition code is generated according to each situation such that it is also possible to reduce service costs and secure vehicle stability by preliminarily removing unexpected side effects.

What is claimed is:

1. A method of learning a continuously variable valve duration (CVVD) position of a CVVD system, the method comprising:
   determining, by a controller, whether to perform a re-learning control to replace an existing learning value with a new learning value for position learning for a valve duration including a short duration and a long duration of the CVVD system based on whether the existing learning value is applicable after a hardware of the CVVD system is replaced;
   determining, by the controller, whether a system environment condition for the CVVD system is normal;
   when the system environment condition of the CVVD system is normal, determining, by the controller, whether a vehicle environment condition for an engine equipped with the CVVD system is satisfied;
   when the system environment condition is normal and the vehicle environment condition is satisfied, performing, by the controller, the re-learning control,
   wherein the re-learning control includes:
      performing a normal learning to obtain the new learning value, wherein performing the normal learning includes:
         associating with a valid learning condition map and determining a current state;
         applying a predetermined CVVD control unit duty for a predetermined time;
         recognizing a position movement in short and long duration directions as a position value; and
         replacing the existing learning value with the new learning value to update and store the existing learning value as a learning value of the position value; and
      performing a valve control of the engine using the new learning value.

2. The method of claim 1, wherein the replaced hardware is a motor of the CVVD system.

3. The method of claim 1, wherein the position learning is performed by setting a Hall sensor, a motor, and a controller area network (CAN), which are applied as the hardware of the CVVD system, as a system environment condition factor and determining whether the system environment condition is normal based on an operation state of the system environment condition factor.

4. The method of claim 3, wherein the system environment condition is determined as being normal when the operation state of each of the hall sensor, the motor, and the CAN is normal.

5. The method of claim 4, further comprising:
   when the system environment condition is not normal, exhibiting a system learning prohibition code by determining the system environment condition as not being validly secured.

6. The method of claim 1, wherein the vehicle environment condition is determined based on engine operating information of the engine, and the engine operation information includes at least one of an engine revolutions per minute (RPM), a vehicle speed, an opening degree of an accelerator pedal, a battery voltage, a temperature of cooling water, or a temperature of intake air.

7. The method of claim 6, further comprising:
   applying a threshold for determining the vehicle environment condition to each of the engine RPM, the vehicle speed, the opening degree of the accelerator pedal, the battery voltage, the temperature of cooling water, and the temperature of the intake air.

8. The method of claim 7, wherein the determining of the vehicle environment condition is performed when each of the engine RPM, the vehicle speed, the opening degree of the accelerator pedal, the battery voltage, the temperature of cooling water, and the temperature of the intake air satisfies the threshold value.

9. The method of claim 8, further comprising:
   when the determining of the system environment condition is not performed, exhibiting a vehicle learning prohibition code by determining the vehicle environment condition as not being validly secured.

10. The method of claim 8, further comprising:
    generating a vehicle learning prohibition code with respect to each of the engine RPM, the vehicle speed, the opening degree of the accelerator pedal, the battery voltage, the temperature of cooling water, and the temperature of the intake air.

11. The method of claim 1, further comprising:
    when the determining of the system environment condition is prohibited or the determining of the vehicle environment condition is not satisfied, directing the controller to perform a re-learning prohibition control.

12. The method of claim 11, wherein the re-learning prohibition control switches the CVVD system to a limp home control.

13. The method of claim 12, wherein the limp home control replaces the existing learning value with a default value to maintain the engine to run while driving.

14. The method of claim 1, further comprising:
    when the position learning is not required, the controller is switched to apply the existing learning value to perform a normal control of the CVVD system.

15. A continuously variable valve duration (CVVD) system of a vehicle, comprising:
    a controller configured to perform a CVVD position learning, wherein the controller is configured to:
       determine whether to perform a re-learning control to replace an existing learning value with a new learning value for position learning for a short duration and a long duration of the CVVD system based on whether the existing learning value is applicable after a hardware of the CVVD system is replaced,
       determine whether a system environment condition for the CVVD system is normal and then determine whether a vehicle environment condition for an engine equipped with the CVVD system is satisfied,
       when the system environment condition is normal and the vehicle environment condition is satisfied, perform the re-learning control in which a position movement in short and long duration directions is recognized as a position value,
       when the system environment condition is not normal or the vehicle environment condition is not satisfied, perform a re-learning prohibition control in which the existing learning value is replaced with a default value, and
       when the position learning is not required, apply the existing learning value to perform a normal control of the CWD system.

16. The CVVD system of claim 15, wherein:
the controller includes a valid learning condition map; and
the valid learning condition map includes:
- a table for securing validity of the vehicle environment condition by setting an engine revolutions per minute (RPM), a vehicle speed, an opening degree of an accelerator pedal, a battery voltage, a temperature range of cooling water, and a temperature range of intake air as engine operation information to determine the vehicle environment condition, and
- a table for securing validity of the system environment condition by setting a sensor, a motor, and a controller area network (CAN) as the hardware of the CVVD system.

17. The CVVD system of claim 16, wherein:
the controller further includes a code generator; and
the code generator generates a system learning prohibition code when the system environment condition is not normal, and a vehicle learning prohibition code when the vehicle environment condition is not satisfied.

18. The CVVD system of claim 17, wherein:
the system learning prohibition code exhibits a failure state of either the sensor, the motor, or the CAN; and
the vehicle learning prohibition code exhibits a detection state with respect to each of the engine RPM, the vehicle speed, the opening degree of the accelerator pedal, the battery voltage, the temperature range of the cooling water, and the temperature range of the intake air.

* * * * *